US010596740B2

(12) United States Patent
Bessac et al.

(10) Patent No.: US 10,596,740 B2
(45) Date of Patent: Mar. 24, 2020

(54) CO-EXTRUSION HEAD FOR CO-EXTRUDING COMPLEX RUBBER PROFILE SECTION FOR MANUFACTURING A TIRE

(71) Applicant: COMPAGNIE GENERALE DES ETABLISSEMENTS MICHELIN, Clermont-Ferrand (FR)

(72) Inventors: Christophe Bessac, Clermont-Ferrand (FR); Mickael Rouby, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 30 days.

(21) Appl. No.: 16/065,511

(22) PCT Filed: Dec. 20, 2016

(86) PCT No.: PCT/FR2016/053585
§ 371 (c)(1),
(2) Date: Jun. 22, 2018

(87) PCT Pub. No.: WO2017/109393
PCT Pub. Date: Jun. 29, 2017

(65) Prior Publication Data
US 2019/0001547 A1    Jan. 3, 2019

(30) Foreign Application Priority Data

Dec. 23, 2015  (FR) ...................................... 15 63247

(51) Int. Cl.
*B29C 48/48* (2019.01)
*B29C 48/30* (2019.01)
(Continued)

(52) U.S. Cl.
CPC .............. *B29C 48/30* (2019.02); *B29C 48/07* (2019.02); *B29C 48/18* (2019.02);
(Continued)

(58) Field of Classification Search
CPC ......... B29C 48/17; B29C 48/19; B29C 48/20; B29C 48/21; B29C 48/30; B29C 48/35;
(Continued)

(56) References Cited

U.S. PATENT DOCUMENTS 4,526,528 A   7/1985  Kline et al.
4,539,169 A   9/1985  Nixon et al.
(Continued)

FOREIGN PATENT DOCUMENTS

EP   0174260 A2   3/1986
EP   0847880 A1   6/1998
(Continued)

OTHER PUBLICATIONS

International Search Report dated Apr. 12, 2017, issued in PCT/FR2016/053585.
(Continued)

*Primary Examiner* — Robert C Dye
*Assistant Examiner* — Shibin Liang
(74) *Attorney, Agent, or Firm* — Venable LLP (57) ABSTRACT

A head is provided for the co-extrusion of a complex rubber profiled element for the manufacture of a tire. The head makes it possible to co-extrude a sublayer and a tread with inserts. To this end, the head includes, from upstream to downstream: a) a first extrusion duct divided into various sub-ducts, b) a discontinuous first profiling blade, c) a second extrusion duct divided into various sub-ducts, d) a discontinuous second profiling blade incorporating at least one third extrusion duct in the continuation of a divider, and e) a first profiling blade having a projecting tooth in front of and next to each outlet of a third duct in the transverse direction.

8 Claims, 5 Drawing Sheets

(51) Int. Cl.
  *B29C 48/35* (2019.01)
  *B29C 48/07* (2019.01)
  *B29C 48/18* (2019.01)
  *B29C 48/49* (2019.01)
  *B29D 30/52* (2006.01)
  *B29L 30/00* (2006.01)

(52) U.S. Cl.
  CPC .......... *B29C 48/3001* (2019.02); *B29C 48/35* (2019.02); *B29C 48/49* (2019.02); *B29D 30/52* (2013.01); *B29L 2030/00* (2013.01)

(58) Field of Classification Search
  CPC ......... B29C 47/32; B29C 47/00; B29C 47/06; B29C 47/085; B29C 47/0019; B29D 30/52
  See application file for complete search history.

(56) References Cited

U.S. PATENT DOCUMENTS

| | | | |
|---|---|---|---|
| 5,017,118 A * | 5/1991 | Loonnan | B29C 48/30 425/133.5 |
| 6,269,854 B1 | 8/2001 | Matsuo et al. | |
| 6,695,606 B1 * | 2/2004 | Burg | B29C 48/92 425/133.5 |
| 6,994,817 B2 | 2/2006 | Calvar et al. | |
| 2001/0022410 A1 | 9/2001 | Benatti | |
| 2002/0190420 A1 | 12/2002 | Benatti | |
| 2003/0136498 A1 | 7/2003 | Calvar et al. | |
| 2008/0105353 A1 | 5/2008 | Losi et al. | |
| 2015/0107735 A1 | 4/2015 | Djelloul-Mazouz et al. | |

FOREIGN PATENT DOCUMENTS

| | | |
|---|---|---|
| EP | 0868991 A1 * | 10/1998 |
| EP | 0868991 A1 | 10/1998 |
| EP | 1448355 A1 | 8/2004 |
| EP | 2865543 A1 | 4/2015 |
| FR | 2916383 A1 | 11/2008 |
| JP | 60-54831 A | 3/1985 |
| WO | 99/38664 A1 | 8/1999 |
| WO | 2004/096583 A1 | 11/2004 |

OTHER PUBLICATIONS

Written Opinion dated Jun. 29, 2017, issued in PCT/FR2016/053585 (in French).

Co-pending U.S. Appl. No. 16/065,536, filed Dec. 20, 2016 (available on USPTO system).

* cited by examiner

CO-EXTRUSION HEAD FOR CO-EXTRUDING COMPLEX RUBBER PROFILE SECTION FOR MANUFACTURING A TIRE

BACKGROUND

The invention falls within the field of tire manufacture, and more precisely within the field of the co-extrusion of complex rubber profiled elements.

What is meant by a complex rubber profiled element is a profiled element made up of different profiled elements made from different elastomeric compounds and assembled with one another.

When a green tire is being built, a tread profiled element taking the form of a portion cut from a complex and unvulcanized rubber profiled element is laid on the shaped carcass.

Figure 1:
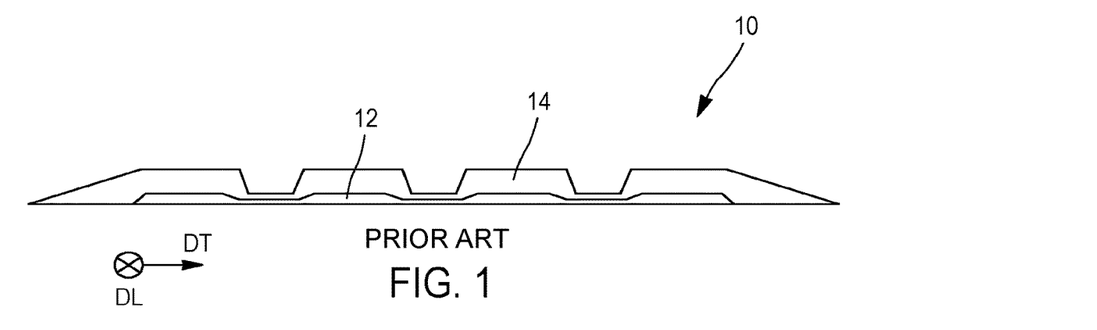
FIG. 1 is a schematic view in cross section of a complex rubber profiled element according to the prior art.

More specifically, and as illustrated in FIG. 1, this portion of complex rubber profiled element 10 includes a transversely continuous sublayer 12 on which another transversely continuous layer 14 is superposed. This other layer 14 is referred to as the tread because it is intended to come into contact with the ground when the tire is running along the ground. Because the sublayer 12 is not intended to come into contact with the ground, it is made from a different elastomeric compound from the tread 14 and does not, for example, have the same composition or the same characteristics and performance.

According to a known method of manufacture, this complex rubber profiled element is obtained by co-extrusion. Using this technique, the various profiled elements of different compounds of the complex profiled element are extruded and assembled simultaneously, on a single manufacturing machine.

Co-extrusion also allows the manufacture of complex profiled elements including a sublayer 12, a tread 14, and other protective profiled elements superposed on the transverse ends of the tread 14 and made from a third elastomeric compound having a composition and characteristics that are different from the characteristics of the sublayer compound and of the tread compound.

However, and like the sublayer 12 and the tread 14, these protective profiled elements are transversely continuous.

Because of the poor electrical conductivity of the elastomeric compounds used for producing the sublayer 12 and the tread 14, co-extrusion machines have been developed that allow the sublayer 12 and the tread 14 to be co-extruded with an insert, made from an electrically conducting elastomeric compound, passing through them.

Such a co-extrusion machine is described, for example in European Patent EP1448355.

According to that document EP1448355, this machine includes a main extruder having an extrusion head with at least two ducts for the flow of a sublayer rubber compound and of a tread rubber compound, the ducts opening onto an extrusion orifice through which the two, sublayer and tread, rubber compounds are discharged, and the extrusion orifice being delimited by a first wall and a second wall.

In order to create an electrically conducting insert through the sublayer and the tread of the co-extruded complex profiled element, the extrusion head also includes at least one micro-extruder of a third, electrically conducting, rubber compound, and the extrusion head of this micro-extruder is equipped at its end with a nozzle, the nozzle passing through the two flow ducts so that the third, electrically conducting, rubber compound is inserted into the sublayer and tread rubber compounds upstream of the extrusion orifice.

A first disadvantage is that the nozzle described in that document EP1448355 is not suitable for extruding an insert made from an elastomeric compound that gives it great stiffness, or at least stiffness that exceeds the stiffness conferred upon each of the sublayer and the tread by their respective compounds. This is because such a compound would need an extrusion pressure that is too high in comparison with the extrusion pressures used to extrude the sublayer and tread compounds, and this could detract from the quality of the co-extruded complex profiled element, notably by leading to the extrusion of an insert that is far wider than needed for electrical conduction or of a cross section that can vary randomly along the length of the profiled element.

Another disadvantage, regardless of whether or not the third compound extruded by this nozzle gives the insert high stiffness, is that this nozzle does not allow the third material to be extruded with a cross section that is precise in the transverse plane of the complex profiled element. Furthermore, neither does this nozzle make it possible to create an insert that is not flanked on either side by the tread and the sublayer.

Now, it so happens that with the increasing use of treads made from elastomeric compounds that give these treads increasingly low stiffnesses and therefore increasingly high hysteresis, there is nowadays within the tire building industry a need to stiffen the complex tread profiled elements via inserts that have a precise cross section in the transverse plane of the complex profiled element, that are not flanked on either side by the tread and the sublayer and that are made from an elastomeric compound that gives them a stiffness higher than the stiffnesses conferred upon the sublayer and the tread by their respective compounds.

SUMMARY

So, an objective of the present invention is to combat at least one of the disadvantages identified in the prior art and to meet the aforementioned needs of industry.

To this end, one subject of the invention is a head for the co-extrusion of a complex rubber profiled element intended for the manufacture of a tire, the head being intended to be mounted on a cylindrical-roller co-extrusion machine and for this purpose having a lower wall of cylindrical profile extending radially lengthwise in a longitudinal direction about a central axis and extending rectilinearly widthwise in a transverse direction parallel to the central axis and perpendicular to the longitudinal direction.

According to the invention, the head includes, from upstream to downstream of this lower wall of cylindrical profile, and in the longitudinal direction:
a) a first extrusion duct opening into the lower wall of the co-extrusion head, this first extrusion duct being divided into various sub-ducts in the transverse direction,
b) a first profiling blade defining a first shaping profile that is discontinuous in the transverse direction and situated radially beyond the lower wall of the co-extrusion head intermittently in the transverse direction,
c) a second extrusion duct opening into the lower wall of the co-extrusion head, this second extrusion duct being divided into various sub-ducts in the transverse direction,
d) a second profiling blade defining a second shaping profile that is discontinuous in the transverse direction and situated radially beyond the lower wall of the co-extrusion head intermittently in the transverse direction, this second profiling blade incorporating at least a third extrusion duct opening into the lower wall of the co-extrusion head, and at least one outlet of this third duct being situated in the continuation of the longitudinal direction of a divider dividing the first extrusion duct into sub-ducts in the transverse direction, creating a discontinuity in the first shaping profile of the first profiling blade in the transverse direction and dividing the second extrusion duct into sub-ducts in the transverse direction, and e) a third profiling blade defining a final shaping profile situated radially beyond the lower wall of the co-extrusion head, this final shaping profile having no discontinuity in the transverse direction, but including a projecting tooth in front of and next to each outlet of a third duct in the transverse direction, each tooth extending radially inwards but not reaching the lower wall of the co-extrusion head.

BRIEF DESCRIPTION OF THE DRAWINGS

Further features and advantages of the invention will become apparent from the following description. This description, which is given by way of non-limiting example, refers to the appended drawings, in which.

DETAILED DESCRIPTION

Figure 2:
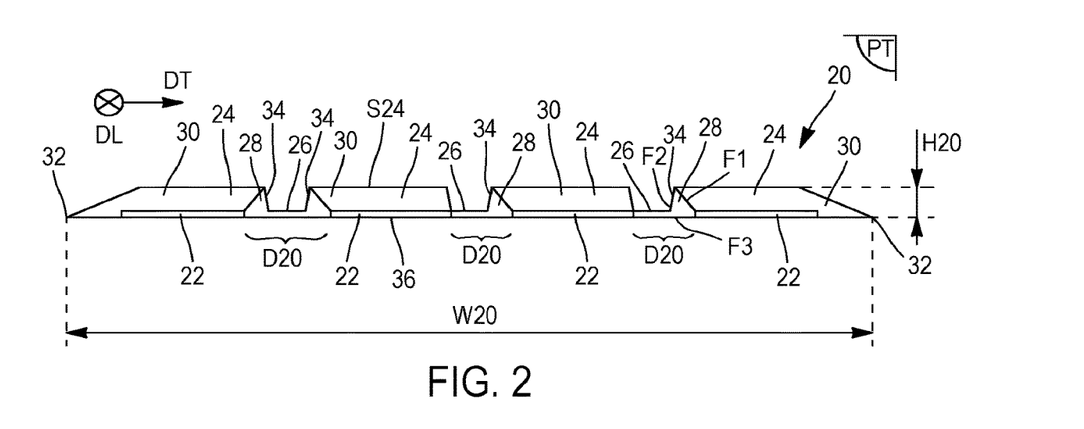
FIG. 2 is a schematic view in cross section of a first alternative form of a complex rubber profiled element that can be produced with a first alternative form of a co-extrusion head according to the invention.
Figure 3:
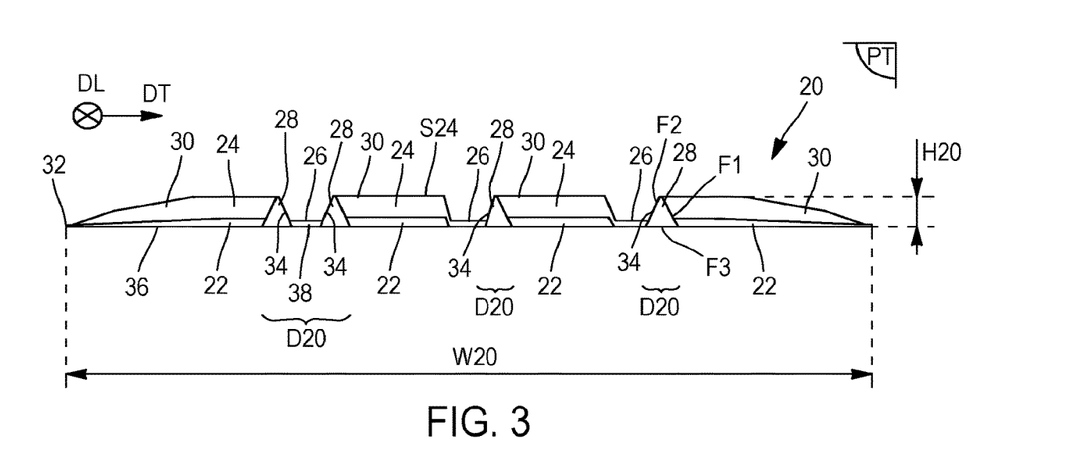
FIG. 3 is a schematic view in cross section of a second alternative form of a complex rubber profiled element that can be produced with a second alternative form of a co-extrusion head according to the invention.

FIGS. 2 and 3 schematically illustrate two alternative forms of complex rubber profiled element intended for the manufacture of tires and that can be manufactured by co-extrusion using the present invention.

In each of these two alternative forms, the complex rubber profiled element 20 includes along its height H20 a first layer 22, referred to as sublayer, of a first rubbery material, and a second layer 24, referred to as tread, of a second rubbery material superposed on the sublayer 22.

What is meant by a rubbery material is an unvulcanized elastomeric compound. Within the context of the present invention, the sublayer 22 and the tread 24 are made from different materials, and therefore from elastomeric compounds that do not have the same composition and/or the same characteristics.

Moreover, and with a view to creating the circumferential voids of the future tire, the complex rubber profiled element 20 also includes longitudinal grooves 26. In each of the two alternative forms illustrated in FIGS. 2 and 3, the complex rubber profiled element 20 includes three longitudinal grooves 26. These three longitudinal grooves 26 run parallel to one another in the longitudinal direction DL considered along the length of the complex profiled element 20. These three longitudinal grooves 26 are spaced apart from one another in the transverse direction DT considered across the width W20 of the complex profiled element 20. These three longitudinal grooves 26 extend depthwise into the height H20 of the complex profiled element 20, without passing through same. These three longitudinal grooves 26 open onto the upper surface S24 of the tread 24. These three longitudinal grooves 26 divide the profiled element into four longitudinal blocks 30, in which the tread patterns of the future tire will be moulded. The two central blocks 30 have a substantially parallelepipedal profile in the transverse plane PT of the complex profiled element 20, whereas the end blocks 30 have a substantially trapezoidal profile in the transverse plane PT of the complex profiled element 20 and taper toward the transverse ends 32 of the complex profiled element 20 in the transverse direction DT.

According to the invention, this tread 24 and this sublayer 20 have at least one discontinuity D20 in the width W20 of the complex profiled element 20 so that at least one insert 28 of a third rubbery material is inserted into each discontinuity D20 of the tread 24 and of the sublayer 22 at the time of co-extrusion.

As the complex rubber profiled element 20 includes three longitudinal grooves 26 in each of the two alternative forms illustrated in FIGS. 2 and 3, the tread 24 and the sublayer 22 exhibit three discontinuities D20 in the width W20 of the complex profiled element 20 and at least one insert 28 in each of these discontinuities D20.

The third rubbery material from which the inserts 28 are made is different from the materials of the sublayer 22 and of the tread 24. This third material of the inserts 28 is an elastomeric compound having a different composition and/or different characteristics from the compounds that form the sublayer and the tread. Advantageously, this third material of the inserts 28 offers higher stiffness than the materials of the sublayer 22 and of the tread 24. Thus, the inserts 28 make it possible to stiffen the longitudinal blocks 30, thereby making it possible to use, for the creation of the tread 24, a material that is less stiff and offers the future tire better grip performance.

More specifically, each insert 28 extends over the entire height H20 of the complex profiled element 20. Each insert 28 has a precise cross section in the transverse plane PT of the profiled element 20. Thus, the cross section of an insert 28 in the transverse plane PT has at least one triangular subsection.

In the first alternative form of the profiled element 20, the cross section of an insert 28 in the transverse plane PT includes a parallelepipedal subsection situated under the triangular subsection, and one and the same insert 28 may have two triangular subsections distant from one another in the transverse direction and joined together by this parallelepipedal subsection. In this first alternative form of the profiled element 20, the bottom of a longitudinal groove 26 is made up of the parallelepipedal subsection of an insert 28.

In the second alternative form of a profiled element 20, the cross section of an insert 28 in the transverse plane PT is triangular. Still in this second alternative form of a profiled element 20, two inserts 28 of triangular cross section may lie in one and the same discontinuity D20 while at the same time being distant from one another in the transverse direction DT. In this second alternative form of a profiled element 20, and in instances in which two inserts 28 of triangular cross section lie in one and the same discontinuity D20, while being distant from one another, the bottom of a longitudinal groove 26 is made up of a band 38, of substantially parallelepipedal cross section, of the material of the tread 24.

In each of the alternative forms of the profiled element 20, each insert 28 forms a sidewall 34 of a block 30. Therefore, a first face F1 of an insert 28 extending into the height H20 of the profiled element 20 is closely adjacent to the materials of the sublayer 22 and of the tread 24, a second face F2 of an insert 28 extending into the height H20 of the profiled element 20 forms the sidewall 34 of a block 30, and a third face F3 of an insert 28 forms the lower surface 36 of the profiled element 20 with the sublayer 22 and possibly with the tread 24 at the transverse ends 32 of the profiled element 20.

Figure 5:
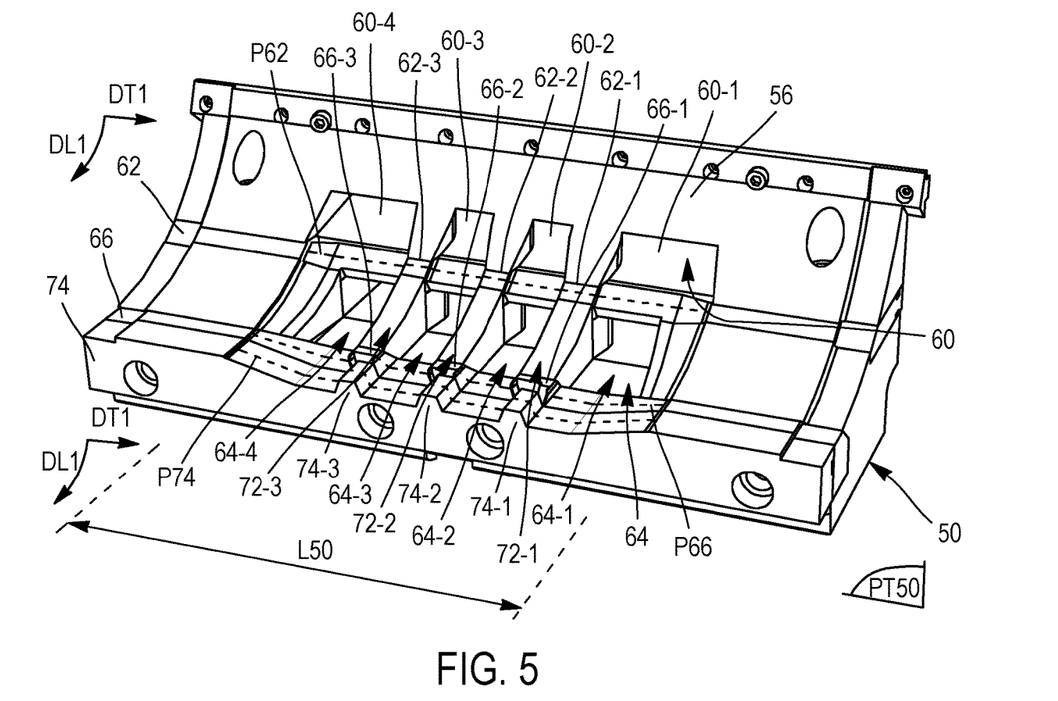
FIG. 5 is a perspective view of a first alternative form of a co-extrusion head according to the invention
Figure 6:
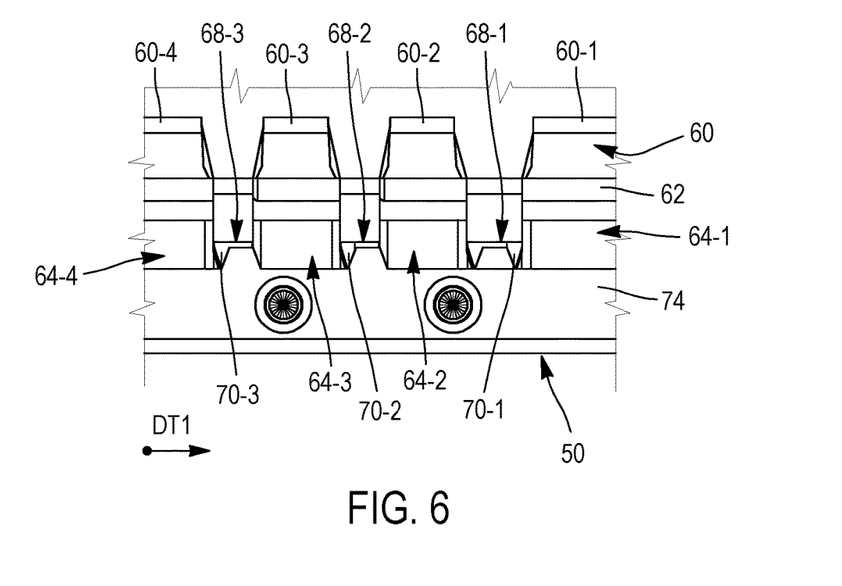
FIG. 6 is a detailed face-on view of a first alternative form of a co-extrusion head according to the invention.
Figure 7:
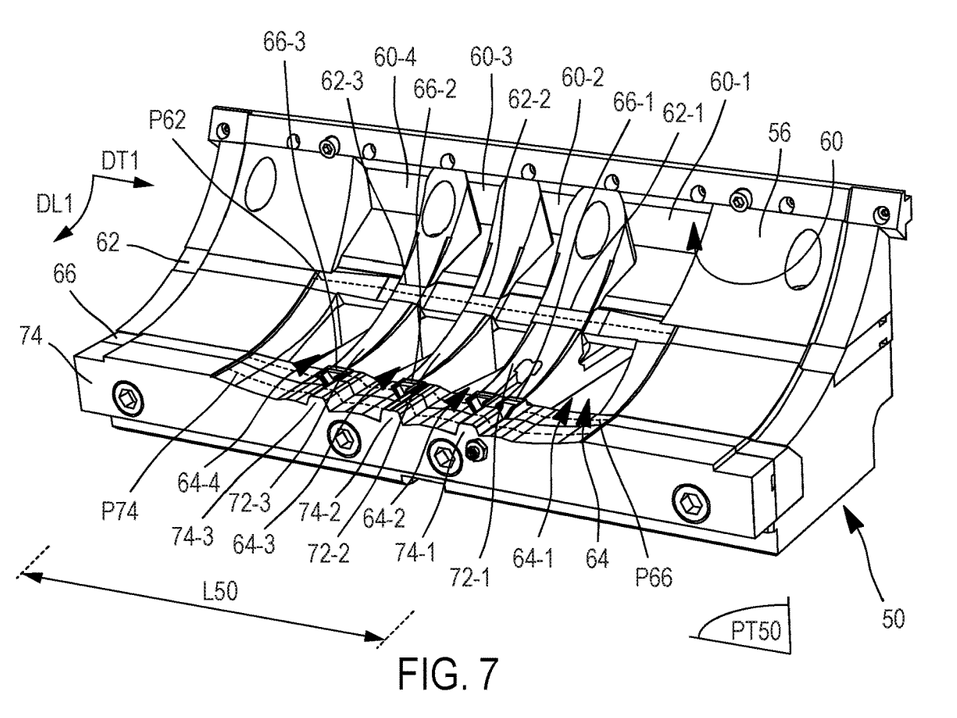
FIG. 7 is a perspective view of a second alternative form of a co-extrusion head according to the invention.
Figure 8:
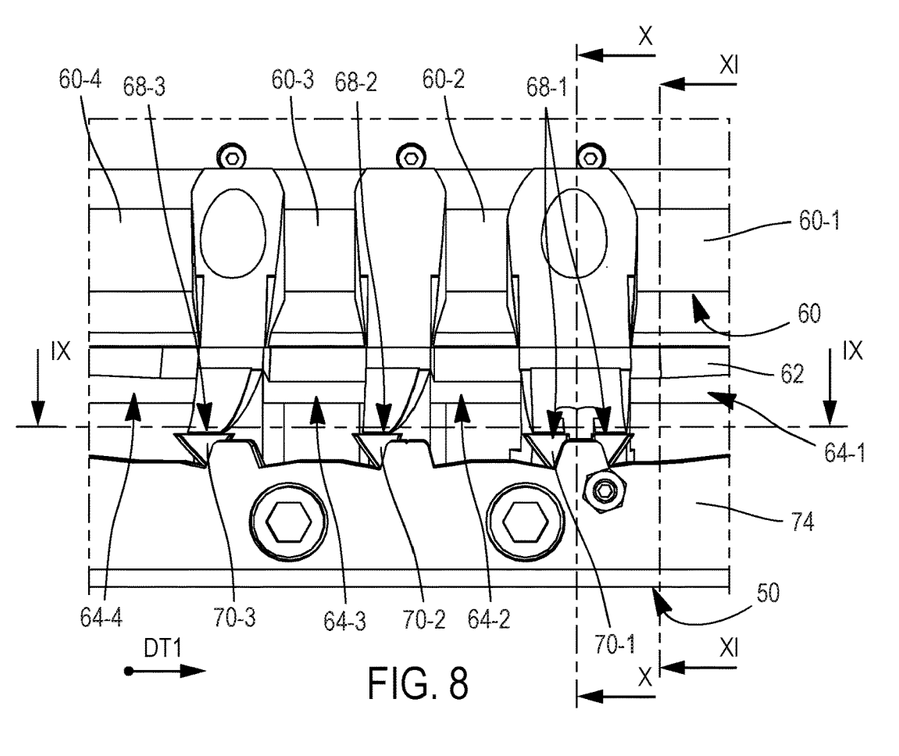
FIG. 8 is a detailed face-on view of a second alternative form of a co-extrusion head according to the invention.

In order to co-extrude these two alternative forms of a complex profiled element 20, the invention proposes a co-extrusion head 50. A first alternative form of this co-extrusion head 50, which is illustrated in detail in FIGS. 5 and 6, is intended for co-extruding the first alternative form of the complex profiled element 20, whereas a second alternative form of this co-extrusion head 50, illustrated in FIGS. 7 and 8, is intended for extruding the second alternative form of the complex profiled element 20.

Figure 4:
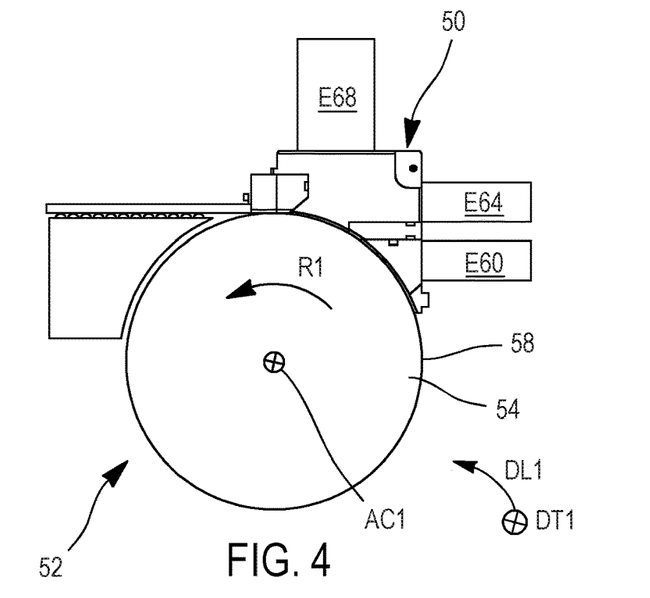
FIG. 4 is a schematic side view of a co-extrusion machine having a co-extrusion head according to the invention.

In each of the alternative forms thereof, and as illustrated in FIG. 4, the head 50 is intended to be mounted on a co-extrusion machine 52 with cylindrical roller 54. To this end, the head 50 includes a lower wall 56 of cylindrical profile extending radially lengthwise in a longitudinal direction DL1 about a central axis AC1 and extending rectilinearly widthwise in a transverse direction DT1 parallel to the central axis AC1 and perpendicular to the longitudinal direction DL1. This lower wall 56 is intended to be attached to the exterior wall 58 of the cylindrical roller 54 so that the complex profiled element 20 can be co-extruded. During operation of the co-extrusion machine, the cylindrical roller 54 is rotated R1 about the central axis AC1.

According to the invention, and likewise in each of the alternative forms thereof, the head 50 includes, from upstream to downstream of this lower wall 56 of cylindrical profile, and in the longitudinal direction DL1:
  a) a first extrusion duct 60 opening into the lower wall 56 of the co-extrusion head, this first extrusion duct 60 being divided into various sub-ducts 60-1,60-2,60-3, 60-4 in the transverse direction DT1:
  b) a first profiling blade 62 defining a first shaping profile P62 that is discontinuous in the transverse direction DT1 and situated radially beyond the lower wall 56 of the co-extrusion head intermittently in the transverse direction DT1,
  c) a second extrusion duct 64 opening into the lower wall 56 of the co-extrusion head, this second extrusion duct 64 being divided into various sub-ducts 64-1,64-2,64-3,64-4 in the transverse direction DT1,
  d) a second profiling blade 66 defining a second shaping profile P66 that is discontinuous in the transverse direction DT1 and situated radially beyond the lower wall 56 of the co-extrusion head intermittently in the transverse direction DT1, this second profiling blade P66 incorporating at least a third extrusion duct 68-1, 68-2,68-3 opening into the lower wall 56 of the co-extrusion head, and at least one outlet 70-1,70-2,70-3 of this third duct being situated in the continuation of the longitudinal direction DL1 of a divider 72-1,72-2, 72-3 dividing the first extrusion duct 60 into sub-ducts 60-1,60-2,60-3,60-4 in the transverse direction DT1, creating a discontinuity in the first shaping profile P62 of the first profiling blade 62 in the transverse direction DT1 and dividing the second extrusion duct 64 into sub-ducts 64-1,64-2,64-3,64-4 in the transverse direction DT1, and
  e) a third profiling blade 74 defining a final shaping profile P74 situated radially beyond the lower wall 56 of the co-extrusion head, this final shaping profile P74 having no discontinuity in the transverse direction DT1, but having a projecting tooth 74-1,74-2,74-3 in front of and next to each outlet 70-1,70-2,70-3 of a third duct 68-1,68-2,68-3 in the transverse direction DT1, each tooth 74-1,74-2,74-3 extending radially inwards but not reaching the lower wall 56 of the co-extrusion head.

While the first extrusion duct 60 allows the first material of the sublayer 22 to be extruded, the sub-ducts 60-1,60-2, 60-3,60-4 allow this first material to be extruded discontinuously across the co-extrusion width L50 of the co-extrusion head 50. Thus, the sub-ducts 60-1,60-2,60-3,60-4 make it possible to generate the discontinuities D20 in the sublayer 22 as soon as this first material is extruded.

Next, the discontinuous first profiling blade 62 includes projecting shapes 62-1,62-2,62-3 extending radially inwards as far as the lower wall 56 and allowing the first material of the sublayer 22 to be profiled while at the same time maintaining the discontinuities D20 created upstream in this sublayer by the sub-ducts 60-1,60-2,60-3,60-4.

While the second extrusion duct 64 allows the second material of the tread 24 to be extruded, the sub-ducts 64-1,64-2,64-3,64-4 allow this second material to be extruded discontinuously across the co-extrusion width L50 of the co-extrusion head 50. Thus, the sub-ducts 64-1,64-2, 64-3,64-4 make it possible to generate the discontinuities D20 in the tread 24 as soon as this second material is extruded.

The discontinuous second profiling blade 66 then includes projecting shapes 66-1,66-2,66-3 extending radially inwards as far as the lower wall 56 and allowing the first and second materials of the sublayer 22 and of the tread 24 to be profiled while at the same time maintaining the discontinuities D20 created upstream in this sublayer 22 and in this tread 24 by the sub-ducts 60-1,60-2,60-3,60-4 of the first duct 60 and by the sub-ducts 64-1,64-2,64-3,64-4 of the second duct 64.

Because it is positioned in the continuation of a divider 72-1,72-2,72-3, the outlet 70-1,70-2,70-3 of each third extrusion duct 68-1,68-2,68-3 allows the third material to be extruded into the discontinuities D20 of the sublayer 22 and of the tread 24 and thus allows the inserts 28 of this third material to be created in the sublayer 22 and in the tread 24.

The third profiling blade 74 completes the profiling of the three materials and gives the profiled element 20 the desired final exit profile. Each tooth 74-1,74-2,74-3 of this third blade 74 allows a groove 26 to be created in the complex profiled element 20 closely adjacent to one or two inserts 28 in the transverse direction DT1.

In the co-extrusion head 50 according to the invention, each projecting shape 62-1,62-2,62-3 of the first profiling blade 62 and each projecting shape 66-1,66-2,66-3 of the second profiling blade 66 respectively forms part of a divider 72-1,72-2,72-3.

When the co-extrusion head 50 is mounted on the co-extrusion machine 52, the ducts 60, 64 and the sub-ducts 60-1,60-2,60-3,60-4,64-1,64-2,64-3,64-4 open into the lower wall 56, and therefore against the external wall 58 of the roller 54, and the shaping profiles P62 and P66 of the first and second profiling blades are closed by the external wall 58 of the roller 54.

In order to give the cross section of an insert 28 in the transverse plane PT of the profiled element 20 at least one triangular subsection, and in each of the alternative forms of the co-extrusion head 50, the outlet cross section of each third duct 68-1,68-2,68-3 includes at least one triangular subsection in a transverse plane PT50 perpendicular to the longitudinal direction DL1. More specifically, one vertex of this triangular subsection extends radially outwards from the lower wall 56 of the co-extrusion head.

In order to give the cross section of an insert 28 in the transverse plane PT of the profiled element 20 at least one parallelepipedal subsection underneath its triangular subsection, and in the first alternative form of the co-extrusion head 50, the outlet cross section of a third duct 68-1,68-2,68-3 in a transverse plane PT50 includes a parallelepipedal subsection situated radially underneath the triangular subsection and extending beyond this triangular subsection in the transverse direction DT1.

In order to give the cross section of an insert 28 in the transverse plane PT of the profiled element 20 two triangular subsections distant from one another in the transverse direction DT of the profiled element 20, and connected by this parallelepipedal subsection, and in the first alternative form of the co-extrusion head 50, the outlet cross section of a third duct 68-1,68-2,68-3 in a transverse plane PT50 includes two triangular subsections connected by a parallelepipedal subsection.

In order to give the cross section of an insert 28 in the transverse plane PT of the profiled element 20 two triangular subsections distant from one another in the transverse direction DT of the profiled element 20, and in the second alternative form of the co-extrusion head 50, the outlet cross section of a third duct 68-1,68-2,68-3 in a transverse plane PT50 includes two triangular subsections distant from one another in the transverse direction DT1 and not connected to one another.

Still in the second alternative form of the co-extrusion head 50, and in order to extrude the band 38 of tread 24 of substantially parallelepipedal cross section between two inserts 28 of triangular cross section lying in one and the same discontinuity D20 while being distant from one another, the divider 72-1 in the continuation of which there is situated an outlet 70-1 of a third duct 68-1 with an outlet cross section having two triangular subsections distant from one another includes an internal duct 76 connecting at least one sub-duct 64-1, 64-2, and preferably both sub-ducts 64-1, 64-2, of the second extrusion duct 64 to the lower wall 56 of the co-extrusion head, this internal duct 76 opening into this lower wall 56 upstream of the outlet 70-1 of this third duct 68-1 in the longitudinal direction DL1 and between the two triangular subsections of this outlet 70-1 in the transverse direction DT1.

Figure 9:
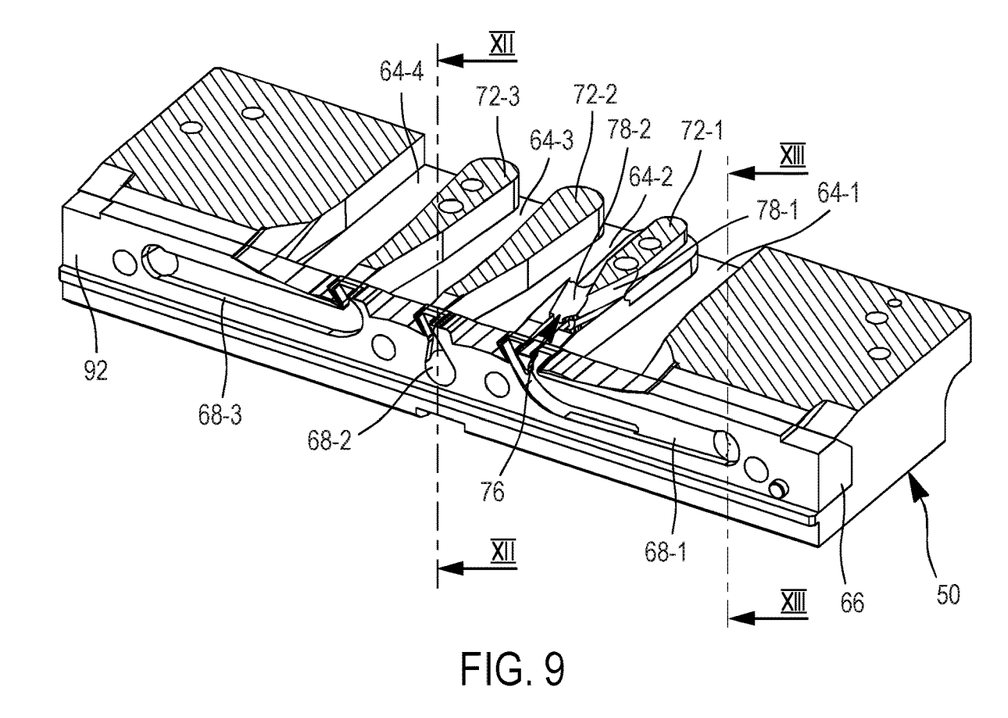
FIG. 9 is a perspective cross-sectional view of a second alternative form of a co-extrusion head according to the invention.

As shown in FIG. 9, this internal duct 76 is produced through the divider 72-1 that divides the second extrusion duct 64 into two sub-ducts 64-1, 64-2 and in the continuation of which an outlet 70-1 of a third duct 68-1 with an outlet cross section having two triangular subsections distant from one another is situated. For preference, and in order to ensure that the internal duct 76 is supplied with tread 24 material, this internal duct 76 has two inlets 78-1, 78-2 respectively connected to the two sub-ducts 64-1 and 64-2.

Figures 10, 11, 12, 13:
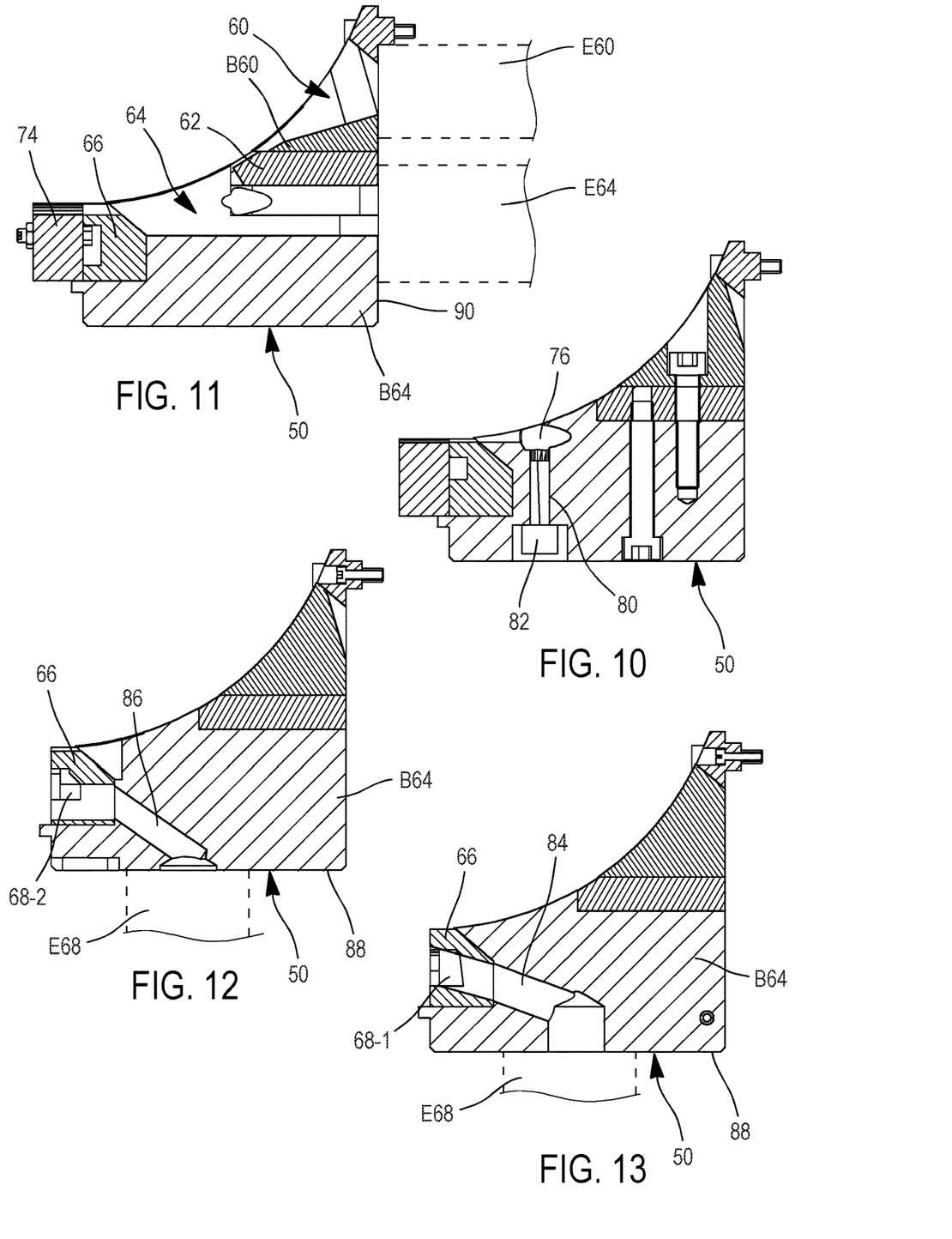
FIG. 10 is a first view in longitudinal section of a second alternative form of a co-extrusion head according to the invention.
FIG. 11 is a second view in longitudinal section of a second alternative form of a co-extrusion head according to the invention.
FIG. 12 is a third view in longitudinal section of a second alternative form of a co-extrusion head according to the invention.
FIG. 13 is a fourth view in longitudinal section of a second alternative form of a co-extrusion head according to the invention.

Advantageously, and as shown in the longitudinal section in FIG. 10, the co-extrusion head 50 includes a well 80 opening into the internal duct 76 and able to accept a screw 82 used for regulating the flow of the tread 24 material in this internal duct 76.

In each of the alternative forms illustrated, the co-extrusion head 50 has three dividers 72-1, 72-2, 72-3 in the transverse direction DT1, these three dividers dividing the first extrusion duct 60 into four sub-ducts 60-1, 60-2, 60-3, 60-4, creating three discontinuities in the first shaping profile P62 of the first profiling blade 62 and dividing the second extrusion duct 64 into four sub-ducts 64-1, 64-2, 64-3, 64-4. The projecting shapes 62-1,62-2,62-3 of the first profiling blade 62 form an integral part of these dividers 72-1,72-2,72-3.

Still in each of the alternative forms illustrated, the co-extrusion head 50 includes two consecutive dividers 72-3,72-2 in the transverse direction DT1 each followed in the longitudinal direction DL1 by an outlet 70-3,70-2 of a third duct 68-3,68-2 including a single triangular subsection, the third divider 72-1 being followed in the longitudinal direction DL1 by an outlet 70-1 of a third duct 68-1 including two triangular subsections.

With a view to extruding the various materials of the tread 24, of the sublayer 22 and of the inserts 28, and as shown in FIGS. 4, 9 and 11 to 13, the first duct 60 is connected to a first extruder E60, the second duct 64 is connected to a second extruder E64, and the third ducts 68-1,68-2,68-3 of the second profiling blade 66 are connected to a third extruder E68.

More specifically, the third ducts 68-1,68-2,68-3 of the second profiling blade 66 are connected to a third extruder E68 via conduits 84,86 opening onto the upper face 88 of the co-extrusion head 50, like the well 80 of the internal duct 76.

As shown in FIG. 11, the first extrusion duct 60 belongs to a first extrusion unit B60, and this first extrusion duct 60 opens onto the rear face 90 of the co-extrusion head 50 where it is connected to the first extruder E60. The second extrusion duct 64 belongs to a second extrusion unit B64, and this second extrusion duct 64 opens onto the rear face 90 of the co-extrusion head 50 where it is connected to the second extruder E64.

As shown in FIG. 9, the third ducts 68-1,68-2,68-3 of the second profiling blade 66 are made in the body 92 of this second profiling blade 66, whereas the conduits 84,86 connecting them to the third extruder E68 are made through the second extrusion unit B64.

Also, the co-extrusion head 50 is formed by the assembly of the first extrusion unit B60, of the first profiling blade 62, of the second extrusion unit B64, and of the second and third profiling blades 66 and 74.

The co-extrusion head 50 as described makes it possible to implement a method for co-extruding a complex rubber profiled element 20 intended for the manufacture of a tire.

According to the invention, the method consists in extruding and profiling the various rubbery materials of this profiled element 20 over a given co-extrusion width L50 and in a longitudinal direction DL1 of co-extrusion perpendicular to the transverse plane PT of the co-extruded profiled element, the method including the following succession of steps:
- a) extruding the first material, this being performed discontinuously across the co-extrusion width L50,
- b) first profiling of this first material, this being performed discontinuously across the co-extrusion width L50,
- c) extruding the second material, this being performed discontinuously across the co-extrusion width L50 and performed in such a way as to superpose the second material on the first material,
- d) profiling of the first and second materials, this being performed discontinuously across the co-extrusion width L50 and performed jointly with an extrusion of the third material into each discontinuity D20 of the first material and of the second material, and
- e) final profiling of the first, second and third materials according to a final profile P74 exhibiting no discontinuity across the co-extrusion width L50 but creating a longitudinal groove 26 in the profiled element 20, this groove being situated transversely next to each insert 28 originating from an extrusion of the third material in step d).

Advantageously, by extruding the third material of the inserts 28 at the end of the co-extrusion method, the geometry of the extruded inserts 28 is protected from the flows of the first and second materials extruded upstream.

In order to give the cross section of an insert 28 in the transverse plane PT of the profiled element 20 at least one triangular subsection, during step d), the third material is extruded with an outlet cross section in a transverse plane PT50 that has at least one triangular subsection.

In order to give the cross section of an insert 28 in the transverse plane PT of the profiled element 20 at least one parallelepipedal subsection underneath its triangular subsection, during step d), the third material is extruded with an outlet cross section in a transverse plane PT50 that has a parallelepipedal subsection situated underneath the triangular subsection and extending beyond this triangular subsection in the transverse direction of extrusion DT1.

In order to give the cross section of an insert 28 in the transverse plane PT of the profiled element 20 two triangular subsections distant from one another in the transverse direction DT of the profiled element 20 and connected by this parallelepipedal subsection, during step d), the third material is extruded with an outlet cross section in a transverse plane PT50 that has two triangular subsections connected by a parallelepipedal subsection.

In order to give the cross section of an insert 28 in the transverse plane PT of the profiled element 20 two triangular subsections distant from one another in the transverse direction DT of the profiled element 20, during step d), the third material is extruded with an outlet cross section in a transverse plane PT50 that has two triangular subsections distant from one another in the transverse direction of extrusion DT1.

In order to extrude the band 38 of tread 24 of substantially parallelepipedal cross section between two inserts 28 of triangular cross section lying in one and the same discontinuity D20 of the profiled element 20 while at the same time being distant from one another, at the same time as performing step c), part of the flow of the second material is diverted toward a discontinuity D20 created during steps a), b) and c) in the superposed first and second materials and between the two distant triangular outlet subsections of the third material in the transverse direction of extrusion DT1.

In order to insert inserts 28 into the three longitudinal grooves 26 of a profiled element 20, during a steps a) to d), three discontinuities are created in the first and second materials in the transverse direction of extrusion DT1.

Because the method is being implemented on the co-extrusion machine 52 with roller 54, the longitudinal direction of co-extrusion DL1 extends radially around the central axis AC1.

For preference, the extruding and profiling steps of the method are performed between a roller 54 and an extrusion head 50 having a lower wall 56 of cylindrical profile collaborating with the exterior wall 58 of the roller.

The present invention also covers a complex rubber profiled element obtained from the method as described, and, for example, using the co-extrusion head that has just been described.

At the same time, the invention also covers a tire manufactured from a complex rubber profiled element obtained from the method as described.

The invention claimed is:

1. A head for the co-extrusion of a complex rubber profiled element for manufacturing a tire, the head being configured to be mounted on a cylindrical-roller co-extrusion machine and comprising a lower wall of cylindrical profile extending radially lengthwise in a longitudinal direction about a central axis and extending rectilinearly widthwise in a transverse direction parallel to the central axis and perpendicular to the longitudinal direction, wherein the head comprises, from upstream to downstream of the lower wall, and in the longitudinal direction:
- a) a first extrusion duct opening into the lower wall, the first extrusion duct being divided into a plurality of sub-ducts in the transverse direction;
- b) a first profiling blade defining a first shaping profile that is discontinuous in the transverse direction and situated radially beyond the lower wall intermittently in the transverse direction;
- c) a second extrusion duct opening into the lower wall, the second extrusion duct being divided into a plurality of sub-ducts in the transverse direction;
- d) a second profiling blade defining a second shaping profile that is discontinuous in the transverse direction and situated radially beyond the lower wall intermittently in the transverse direction, the second profiling blade including at least one third extrusion duct opening into the lower wall, wherein at least one outlet of the at least one third extrusion duct is situated in a continuation of the longitudinal direction of a divider dividing the first extrusion duct into the plurality of sub-ducts thereof in the transverse direction, creating a discontinuity in the first shaping profile of the first profiling blade in the transverse direction and dividing the second extrusion duct into the plurality of sub-ducts thereof in the transverse direction; and
- e) a third profiling blade defining a final shaping profile situated radially beyond the lower wall, the final shaping profile having no discontinuity in the transverse direction, and comprising a projecting tooth in front of and next to each outlet of the at least one third extrusion duct in the transverse direction, each projecting tooth extending radially inwards without reaching the lower wall.

2. The head according to claim 1, wherein the outlet cross-section of each at least one third extrusion duct comprises at least one triangular subsection in a transverse plane perpendicular to the longitudinal direction.

3. The head according to claim 2, wherein the outlet cross-section of a third extrusion duct of the at least one extrusion duct in a transverse plane comprises a parallelepipedal subsection situated radially underneath the triangular subsection and extending beyond the triangular subsection in the transverse direction.

4. The head according to claim 3, wherein the outlet cross-section of a third extrusion duct of the at least one extrusion duct in a transverse plane comprises two triangular subsections connected by a parallelepipedal subsection.

5. The head according to claim 2, wherein the outlet cross-section of a third extrusion duct of the at least one extrusion duct in a transverse plane comprises two triangular subsections distant from one another in the transverse direction and not connected to one another.

6. The head according to claim 5, wherein the divider, in the continuation of which there is situated an outlet of a third extrusion duct of the at least one extrusion duct with an outlet cross-section comprising two triangular subsections distant from one another, comprises an internal duct connecting at least one of the plurality of sub-ducts of the second extrusion duct to the lower wall, the internal duct opening into the lower wall upstream of the outlet of the third extrusion duct in the longitudinal direction and between the two triangular subsections of the outlet in the transverse direction.

7. The head according to claim 1, further comprising three dividers in the transverse direction, the three dividers (a) dividing the first extrusion duct into the plurality of sub-ducts thereof, which are four in number, (b) creating three discontinuities in the first shaping profile of the first profiling blade, and (c) dividing the second extrusion duct into the plurality of sub-ducts thereof, which are also four in number.

8. A machine for the co-extrusion of a complex rubber profiled element for manufacturing a tire, the machine comprising:
    a cylindrical roller; and
    a co-extrusion head according to claim 1, the head being mounted on the cylindrical roller.

* * * * *